Aug. 17, 1926.
J. J. FUCHS
1,596,823
TIRE REPAIRING TOOL
Filed May 28, 1926
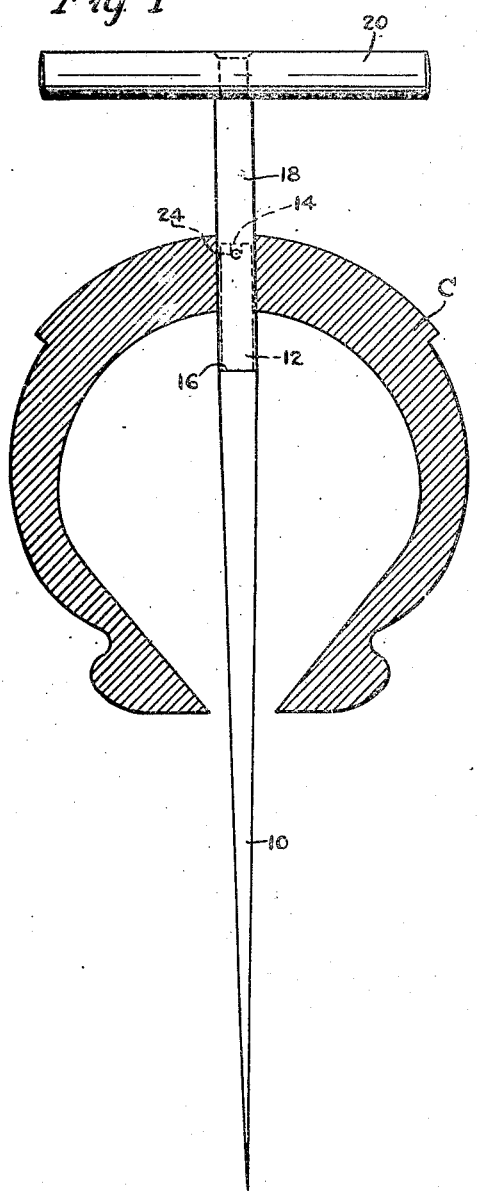
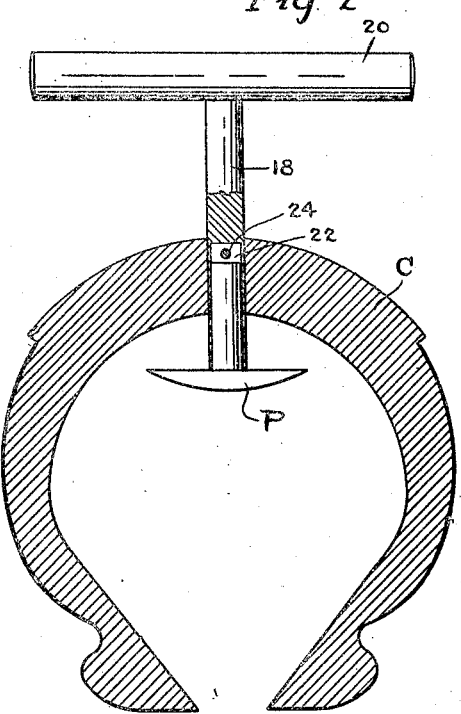
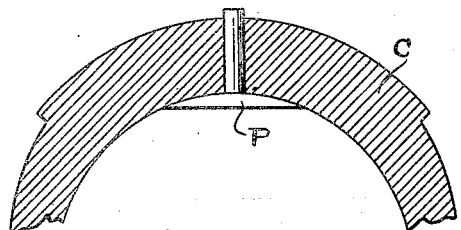
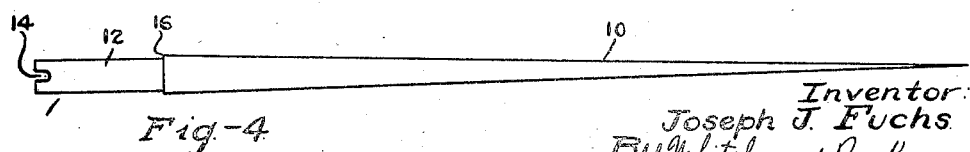
Inventor:
Joseph J. Fuchs
By Whiteley and Ruckman
Attorneys Patented Aug. 17, 1926.

1,596,823

UNITED STATES PATENT OFFICE.

JOSEPH J. FUCHS, OF MINNEAPOLIS, MINNESOTA.

TIRE-REPAIRING TOOL.

Application filed May 28, 1926. Serial No. 112,222.

My invention relates to tire repairing tools. Holes are sometimes cut in tire casings by nails and other sharp objects which are encountered on the highway. Such holes are apt to have an injurious effect on the casing and the inner tube since they permit entrance of water and grit. An object, therefore, of my invention is to provide a tire repairing tool by means of which such holes may be closed by rubber plugs inserted from the inside of the casing by application of the tool from the outside of the casing.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is an elevational view of the tool in its assembled condition illustrating the manner of using the same in connection with a tire casing. Fig. 2 is a view of the upper member of the tool showing a plug held thereby for insertion in a hole of the casing. Fig. 3 is a view showing the plug inserted in the casing. Fig. 4 is a view showing the lower member of the tool detached from the upper member.

Referring to the construction shown in the drawings, it will be noted that the tool consists of two members which have telescopic engagement with each other to the extent shown in Fig. 1. The lower member consists of a long tapering needle portion 10 which is solid and terminates in a short cylindrical portion 12 having a notch 14 at its free end and a shoulder 16 where it joins with the needle portion. The upper member consists of a shank 18 having a handle 20 at one end. The shank 18 is cylindrical and is solid for a considerable portion of its length below the handle member while its lower portion is hollow to provide a socket 22 for receiving the cylindrical portion 12 of the needle member. Near the bottom of the socket 22, a pin 24 extends across the same so as to fit into the notch 14 at the upper end of the needle member and prevent relative rotation of the upper and lower members when they are assembled and are being used in connection with the casing. The provision of the shoulder 16 causes the tool to have a smooth outer surface without any projecting shoulder when the members are assembled.

The operation and advantages of my invention will now be obvious. In use, the two members are assembled and the point of the needle is pushed through the hole in the casing C from the outside of the latter until the shank 18 is positioned in the hole as shown in Fig. 1. The needle member is then detached and the shank of a rubber plug P is inserted in the socket 22 of the upper member as shown in Fig. 2 whereupon this member is pulled upwardly, thus leaving the plug P in the position shown in Fig. 3. The provision of the handle 20 makes it an easy matter to insert and remove the tool. The tool may be used as a feeler when the hole in the casing shows only on the inside. In order to use the tool for this purpose, the point of the needle is pushed through the hole in the casing from the inside, and the point on the outside of the casing may be observed for properly locating the place where the tool is to be inserted.

I claim:

1. A tire repairing tool comprising a needle member, a shank member, and means for attaching and detaching said members with relation to each other.

2. A tire repairing tool comprising a needle member, a shank member, means for attaching and detaching said members with relation to each other, and a handle member on the outer end of said shank member.

3. A tire repairing tool comprising a needle member which tapers to a point at one end, and a shank member having a socket at one end to receive the other end of said needle member.

4. A tire repairing tool comprising a needle member which tapers to a point at one end and which has a cylindrical portion at the other end, and a shank member having a socket at one end to receive said cylindrical portion.

5. A tire repairing tool comprising a needle member which tapers to a point at one end and which has a cylindrical portion at the other end, and a shank member having a socket at one end to receive said cylindrical portion, the needle member having a shoulder whereby the tool has a smooth outer surface when the two members are assembled.

6. A tire repairing tool comprising a needle member which tapers to a point at one end and which has a cylindrical portion at the other end, the free end of said cylindrical portion containing a notch, a shank member having a socket at one end to receive said cylindrical portion, the needle member having a shoulder whereby the tool has a smooth outer surface when the two members are assembled, and a pin extending across said socket for fitting into said notch.

In testimony whereof I hereunto affix my signature.

JOSEPH J. FUCHS.